Aug. 2, 1927.
J. T. CRANE
BRAKE
Filed Nov. 5, 1925
1,637,894
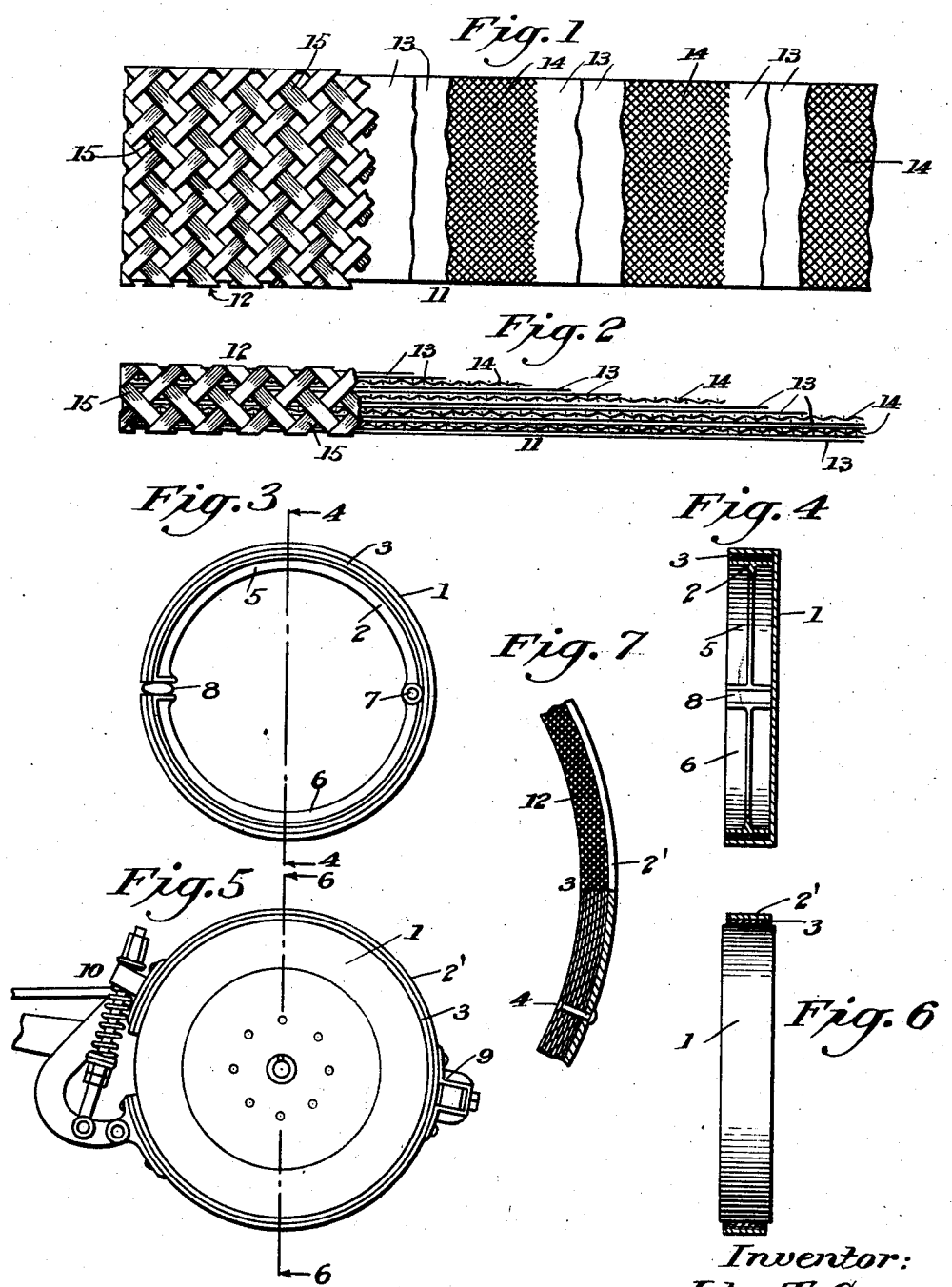

Patented Aug. 2, 1927.

1,637,894

UNITED STATES PATENT OFFICE.

JOHN T. CRANE, OF LOS ANGELES, CALIFORNIA.

BRAKE.

Application filed November 5, 1925. Serial No. 67,036.

This invention relates to brakes, particularly adapted for application to automobiles and other types of vehicles, and the main object is to provide a brake embodying a new type of friction element for application by usual means to the rotating brake member, said friction element being nearly if not entirely metallic in character, and free from combustible material, therefore lending longer life to and rendering the brakes more efficient and durable.

Another object is to provide a brake embodying a rotatable member, a non-rotatable member and a composite metallic friction element supported on the non-rotatable member for application to the rotatable member, said friction element being composed of shreds, strands or laminations of one or more metals of different melting coefficients, arranged compactly and covered with a metallic braid.

This invention contemplates the application of the friction element to the contracting brake bands, expanding shoes, or bands, such as are employed on automobile brakes now in use extensively, or in connection with forms of carriers.

It will be understood that in obtaining types of friction brakes in general use on automobiles a lining of asbestos and other materials is used, and this type of lining is susceptible to great and undue wear, heats rapidly, and deteriorates quickly when so heated, thus providing but short use and frequently requiring renewals. It is an object of this invention, therefore, to provide as a component element of a friction brake of the character described, a non-integral, yet composite all metal brake lining, in which metals of relatively high melting point, in sheet or ribbon form, laid flatwise or crinkled, shredded or stranded, and arranged in a suitable manner as to provide a maximum tensile strength, the core thus formed being enclosed in a metal braid of one or more ply, for reinforcing the structure, and the completed element riveted or otherwise attached to the contracting or expanding band or shoe, for application to the rotating drum.
Other objects will appear as the description progresses.

The invention is illustrated in the annexed drawings which form a part of the specification, and in which:
Fig. 1 is a plan view of the composite friction element of my brake, with the braid and a number of laminations thereof partly broken away for the purpose of illustration.

Fig. 2 is a side edge view of the friction element shown in Fig. 1, with the braid partly broken away for the purpose of illustration.

Fig. 3 is a side view of an automobile internal drum brake embodying my invention.

Fig. 4 is a transverse vertical sectional view of my brake taken on line 4—4 of Fig. 3.

Fig. 5 is a side view of an automobile external drum brake embodying my invention.

Fig. 6 is a transverse vertical section of my brake taken on line 6—6 of Fig. 5.

Fig. 7 is an enlarged fragmentary edge view of the brake shoe and friction element shown partly in section and partly in elevation.

Corresponding reference characters designate the same parts in all the views.

My brake comprises, generally, a movable member such as a rotatable drum 1, an applicator 2, and a friction element 3 secured to the applicator 2 in any suitable manner, as for example, by rivets 4.

In Fig. 3 I have illustrated my invention as embodied in an internal drum brake, the applicator 2 forming the shoe of said brake and comprising two resilient sections 5 and 6, pivoted at one end at 7, and being engaged at their other ends by means of cam 8, whereby said sections are swung outwardly on their pivot so that the friction element 3 will engage the inner surface of the drum 1 and apply the brake.

In Fig. 5 my invention is illustrated as embodied in an external brake, the applicator 2' forming the brake band thereof, which band is fixed intermediate its ends to a securing element 9 and connected at its ends to a conventional contracting and expanding means 10 whereby the band is contracted so that the friction element 3 will be brought in contact with the drum 1 to apply the brake, or expanded to disengage said element from the drum to release the brake.

My friction element 3 is of special construction which includes a metallic laminated core 11 and may or may not have a metallic armor covering such as a metallic braid 12 enclosing said core, depending upon requirements of use. The laminations of the core may consist of a plurality of thin sheets of metal foil 13, such as aluminum, lead, copper or other metallic foil, and a plurality of sheets of fine metallic wire gauze 14, preferably of copper wire, the wire gauze 14 being interposed at suitable intervals between the metal foil sheets 13. The covering 12 may be a sheet of braided material consisting of fine wire such as copper, lead or other wire 15, grouped together in strands forming the braids.

In the manufacture of the friction element 3 the several metallic sheets 13 and 14 are carried in the form of rolls, and are moved between rollers so as to be properly positioned one upon the other in the form shown, and if desirable the metallic sheets may be crinkled together, after which they are braided in a suitable braiding machine with the outer armor of braid 12.

It will be understood that the percentage of copper braid and aluminum or other materials will necessarily be varied according to the requirements of use, as, for instance, when used on a light automobile or car the percentage of metals having a high melting point may be reduced and the percentage of metals having a low melting point correspondingly increased, while on the other hand, when used on a truck or heavy vehicle the percentage of metals having a high melting point should be increased. Usually a minimum quantity of lead, which is a metal with a very low melting point is used, and the aluminum predominates in the structure, while only a sufficient quantity of lead and copper are employed in either case.

By forming the friction element 3 of composite material in different shapes and varying the quantity and kinds of metallic foil, the wire gauze and the outer metallic braid in consistency, strength, durability and cost of manufacture will be correspondingly varied to meet different requirements of use.

In actual use it has been demonstrated that my friction element 3, being nearly, if not entirely metallic in character, and free from combustile materials, lends a longer life to and renders the brake more efficient and durable than otherwise.

What I claim is:

1. A brake comprising a supporting member, and a friction element held thereon and composed of a plurality of superimposed sheets of metal foil.

2. A brake comprising a supporting member, and a friction element composed of a plurality of superimposed sheets of metal foil and wire gauze.

3. A brake comprising a supporting member, a friction element composed of a plurality of metallic laminations, and a metallic braid enclosing said laminations.

4. A brake including a friction element composed of a plurality of strips of metal foil, and a metallic braid covering said foil.

5. A friction brake element formed of a plurality of strips of flexible metal, and a metal braid enclosing said strips.

6. A friction brake element composed of a plurality of strips of flexible metal, and a metal braid enclosing said strips, said braid and strips being compressed together and molded into flat cross section for use.

7. A friction brake element composed of a plurality of strips of flexible metal, a plurality of strips of metal gauze, and a metal braid enclosing said strips.

8. A friction brake element composed of a plurality of strips of flexible metal foil, a plurality of strips of metal gauze forming a core, and a metal braid enclosing said core, said core and said braid being molded into a flat cross section for use.

JOHN T. CRANE.